Sept. 8, 1953  C. F. GREGG  2,651,139
DUSTING GUN

Filed Aug. 10, 1949  3 Sheets-Sheet 1

INVENTOR.
Charles F. Gregg
BY
W. P. Hahn
ATTORNEY.

Sept. 8, 1953　　　C. F. GREGG　　　2,651,139
DUSTING GUN
Filed Aug. 10, 1949　　　3 Sheets-Sheet 2
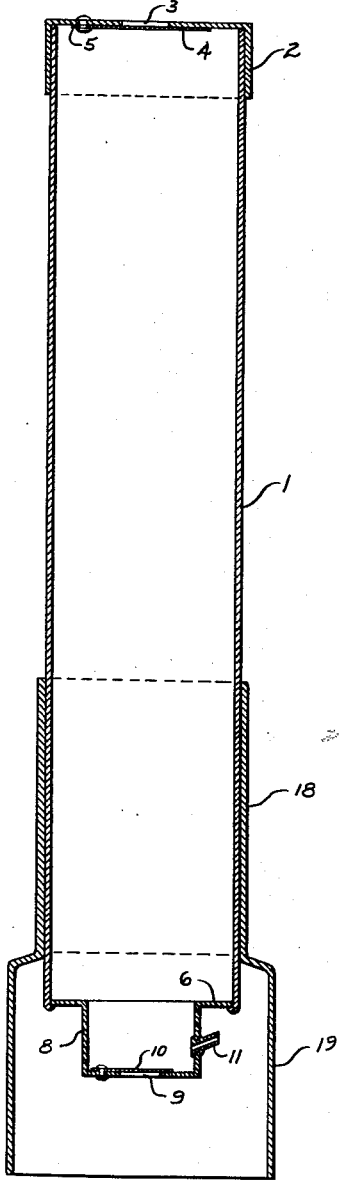
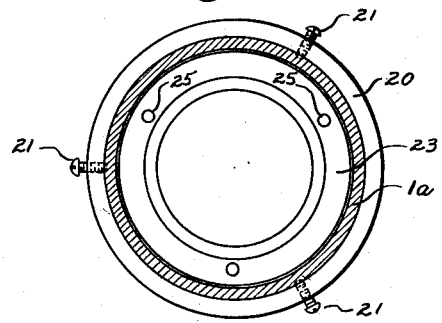
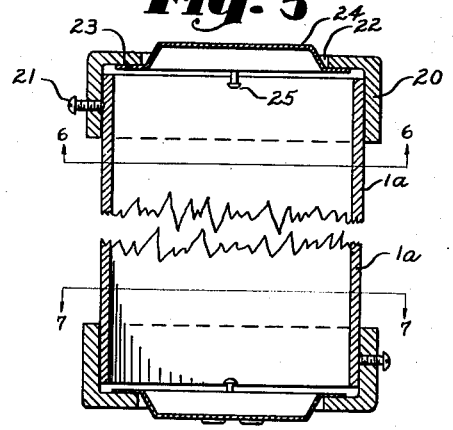
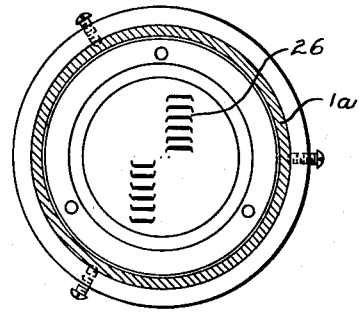
INVENTOR.
Charles F. Gregg
BY
W. P. Hahn
ATTORNEY.

Sept. 8, 1953

C. F. GREGG 2,651,139

DUSTING GUN

Filed Aug. 10, 1949

INVENTOR.
Charles F. Gregg
BY
W. P. Hahn
ATTORNEY.

Patented Sept. 8, 1953

2,651,139

UNITED STATES PATENT OFFICE 2,651,139

DUSTING GUN

Charles F. Gregg, Indianapolis, Ind.

Application August 10, 1949, Serial No. 109,511

2 Claims. (Cl. 43—147)

1

The present invention relates to improvements in dusting guns, primarily of that type for distributing dusting powders on plants for the prevention of insect attack thereon.

One of the objects of the invention is to provide a dusting gun by which the powder may be dusted either on the top or the bottom side of the leaves of the plants to be dusted by the simple shaking action on the part of the operator.

Another object of the invention is to provide a dusting gun wherein means are provided for preventing caking or solidification of the dusting powder caused by humidity.

Further objects of my invention will appear hereinafter in my specification.

For the purpose of disclosing my invention I have illustrated certain embodiments thereof in the accompanying drawings in which:

Fig. 4 is a longitudinal section view of a modification of my invention shown in Fig. 1;

Fig. 5 is a section view showing modified forms of valves used in connection with my invention;

Fig. 6 is the sectional view on the line 6—6 of Fig. 5;

Fig. 7 is the sectional view of line 7—7 of Fig. 5;

Figure 1:
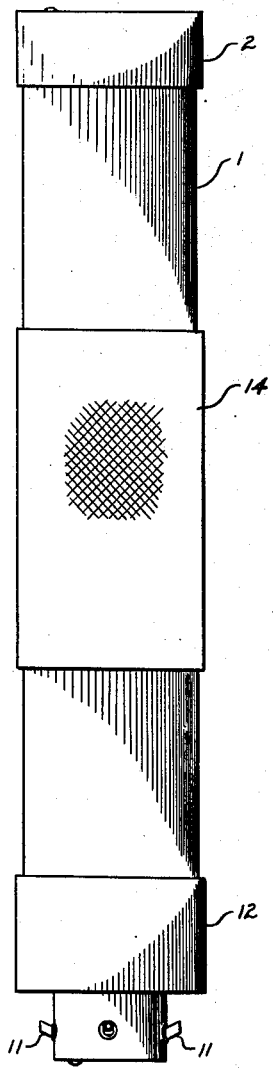
Fig. 1 is a perspective view of a dusting gun embodying my invention.
Figure 2:
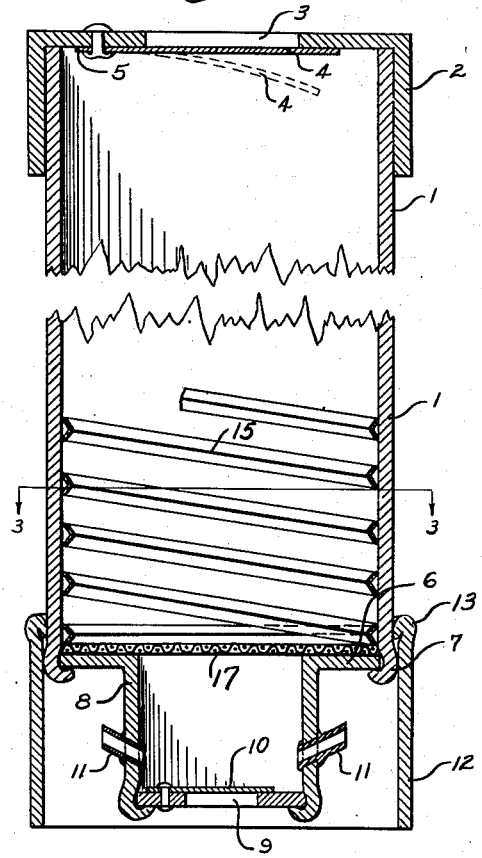
Fig. 2 is a longitudinal sectional view of the structure shown in Fig. 1 with the handle sleeve removed.
Figure 3:
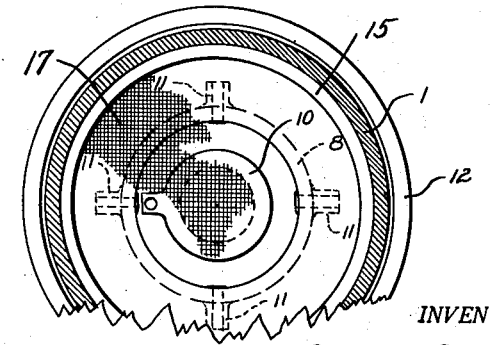
Fig. 3 is a section taken on the line 3—3 of Fig. 2.

In the embodiment illustrated in Figs. 1, 2 and 3 I provide a tubular container 1 which may be cylindrical in form and which may be made of paper, sheet metal or any desired material. This container 1 is provided at its top with a removable cap 2 having a valve opening 3 closed by a flap valve 4. The valve may be of any suitable material, but is preferably made of thin sheet metal having a tongue 5 which is riveted to the under side of the cap 2. The metal is thin enough so that the valve will open downwardly or inwardly under normal air pressure when the tube 1 is moved upwardly with a fast jerking movement.

The lower end of the tube is closed by a nozzle comprising a disk like member 6 preferably secured in position in the top 1 by beading the lower end of the top over the disk. This beading not only secures the disk in position but also forms a shoulder as at 7 for the purpose more fully hereinafter appearing.

The disk 6 is provided with a cylindrical nozzle 8, having a valve opening 9 adapted to be closed by a flapper valve 10 of the same construction as the flapper valve 4. It is to be noted, however, that the flapper valve 10 opens in a direction opposite to that of the valve 4. The nozzle 8 is provided around the circumference with a plurality of spray nozzles 11, which may be in the form of small tubular nozzles secured in the discharge nozzle 8 and inclined upwardly as illustrated in Fig. 2.

Surrounding the top 1 is a direction shield 12 which is slidably mounted on the body 1 and at its upper end is provided with a bead 13 which cooperates with the bead 7 to limit the downward movement of the shield 12. Likewise surrounding the body 1 is a cylindrical handle 14 through which the body 1 is adapted to reciprocate.

Within the body 1 I preferably mount a coil spring 15 which may be of any desired cross section, although the cross section illustrated in the drawing I have found to be preferable, and this spring is preferably anchored at its upper end as at 16 to the top of the tubular member. The lower end of the spring has secured thereto a disk like screen 17 which is of sufficient diameter to fit over the nozzle opening in the disk 6. In the operation of the device, the cap 2, which may be removed, is removed and the desired quantity of dusting powder is deposited in the tubular body member 1. With the cap 2 replaced in position and the operator grasping the cylindrical handle 14 the whole tubular structure may be rapidly reciprocated. With the body member being reciprocated, as the body member is moved downward the bottom valve 10 will open and the top valve 4 will close. This permits a displacement of the body of the material upward relatively to the body member 1. If, however, the downward movement of the body member 1 is brought to a sudden stop the body of the material will move downwardly relative to the body 1 with the upper valve 4 opening and the bottom valve 10 closing. A piston like downward movement of the material will force the material into the nozzle 8 and out through the spray nozzles 11 in a direction inclined upwardly from the horizontal.

If, however, it is desired that the dust be directed to the top of the foliage, the shield 12 is lowered to the position illustrated in Fig. 2 and the dusting powder will spray out of the spraying nozzle 11 and will strike the inner surfaces of the shield 12 and be directed vertically downwardly in a fine mist like form.

During the operation of the device a certain proportion of the dusting powder may become accumulated under the edge of the valve 10, holding the valve slightly open and I have found this to be an advantage as it permits a certain amount of the dusting powder to escape through the valve 10 which, if desired, may be provided with small openings.

The coiled spring 15, with its attached screen 17 serves not only to agitate the dusting powder within the tubular body 1 and thereby prevent the same from caking, especially under extreme humidity conditions, but also seems to have a piston like effect in forcing the dusting powder into the nozzle 8. The screen 17 serves to effectually break up the caked dusting powder and furthermore, supplements the piston like action of the spring and the body of the powder, driving the powder into the nozzle 8 with considerable force with the result of a wider distribution of the powder through the spraying nozzles 11.

In Fig. 4 I have shown a modification of my invention wherein the cylindrical handle 14 and the shield 12 are made in one part, the handle 18, being in this instance provided with an enlarged extension 19 which is of sufficient length to permit reciprocation of the tube 1 without moving the nozzle 8 beyond the lower extremity of the shield 19. Of course in the event it is desired to use the gun without the shield 19, the cylindrical handle 18 may be moved higher up on the tube 1.

In Figs. 5, 6 and 7 I have illustrated a modified form of a valve which may be used in connection with the tubular member 1a. In this structure a top cap 20 is securely positioned on the tubular body 1 through the medium of set screws 21. This top cap is provided with a valve opening 22 which is closed by a disc like valve 23 having a slightly truncated cone shaped projection 24 which fits within the opening 22. The top of the cap 20 is sufficiently spaced apart from the top of the tubular body 1 to provide a slight clearance whereby the valve may be moved inwardly to open. In order to prevent the valve member 23 from dropping out of the cap when the cap is removed, I provide restraining pins 25.

The bottom valve is substantially of the same construction as the top valve with the exception that the bottom wall of the valve member is provided with louvers 26 which provide escape openings for the dusting powder and due to the direction of the louver walls the powder is discharged in an angular direction.

Figure 8:
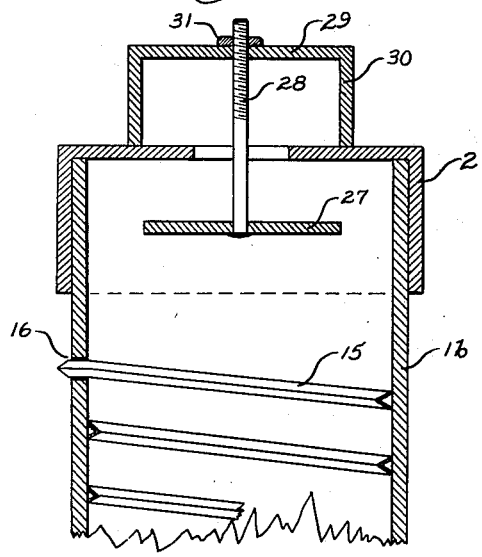
Fig. 8 is the sectional view showing modified form of inlet valve.
Figure 10:
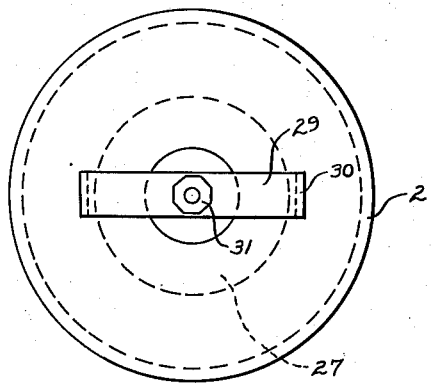
Fig. 10 is the top plan view of the structure shown in Fig. 8.
Figure 9:
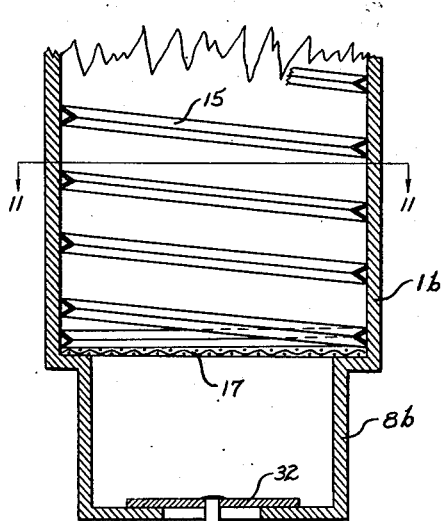
Fig. 9 is the sectional view showing modified form of outlet valve.
Figure 11:
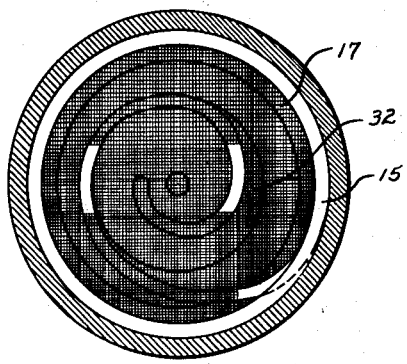
Fig. 11 is the sectional view on the line 11—11 of Fig. 9.

A still further form of valve for use in connection with my dusting gun is illustrated in Figs. 8 and 9. In Fig. 8 I have shown a top valve which consists of a valve disc 27 adapted to close the opening 3 in the cap 2. This disc is mounted on a threaded stem 28 which, on the exterior of the cap is threaded through a cross member 29 having inturned stops 30. The exterior end of the stem 28 is provided with a lock nut 31. By this arrangement the valve may move in and out under the reciprocating movement of the tubular body 1b and the extent of opening is limited by the stop arms 30 the extent of which may be adjusted by adjusting the cross member 29 on the stem 28.

The lower valve, illustrated in Fig. 9, comprises a valve disc 32 having a threaded stem 33 which threads through a cross member 34 having inturned stops 35, similar to the valve illustrated in Fig. 8. However, beyond the cross member 34 I provide a deflecting disc 36 through which the valve stem 33 passes. This disc is restrained against downward displacement by the adjusting nut 37.

As heretofore explained the bottom valve does not completely close as a result of a certain amount of dusting powder accumulating on the under side of the valve, or the bottom valve may have discharge openings therein. Under these circumstances a certain amount of dusting powder is discharged through the valve and this dusting powder striking on the disc 36 is broken up into fine particles to be evenly distributed.

I claim as my invention:

1. A dusting gun comprising a bodily reciprocable tubular container body adapted to receive and be partially filled with dusting powder and having a discharge opening at its lower end, closure valves disposed at the opposite ends of said body and opening and closing in opposite directions and a screen disposed at the lower end of said body above the discharge opening said valves being closed under the piston-like action of the body of the powder during the reciprocal movement of the container.

2. A dusting gun comprising a bodily reciprocable tubular container body adapted to receive and be partially filled with dusting powder and having a discharge opening at its lower end, closure valves disposed at the upper and lower ends of said body and opening and closing in opposite directions, a coiled spring disposed within said body and a screen member disposed within said body at the lower end of said spring said valves being closed under the pressure developed by the piston-like action of the body of the powder during the reciprocal movement of the container.

CHARLES F. GREGG.

References Cited in the file of this patent

UNITED STATES PATENTS

| Number | Name | Date |
|---|---|---|
| 22,669 | Payne | Jan. 18, 1859 |
| 97,369 | Dugdale | Nov. 30, 1869 |
| 862,984 | Marsh | Aug. 13, 1907 |
| 1,451,138 | Bernstein | Apr. 10, 1923 |
| 1,542,430 | Wever | June 16, 1925 |
| 1,571,311 | Wittjen | Feb. 2, 1926 |
| 1,600,861 | Allgrunn | Sept. 21, 1926 |
| 1,611,388 | Stewart | Dec. 21, 1926 |
| 1,777,278 | Huntington | Sept. 30, 1930 |
| 2,014,789 | Suelflow | Sept. 17, 1935 |